United States Patent
Sung et al.

(10) Patent No.: US 10,253,122 B2
(45) Date of Patent: Apr. 9, 2019

(54) ETHYLENE-1-HEXENE-1-BUTENE TERPOLYMER AND A FILM INCLUDING THE SAME

(71) Applicant: LG CHEM, LTD., Seoul (KR)

(72) Inventors: Yu Taek Sung, Daejeon (KR); Heon Yong Kwon, Daejeon (KR); Dae Sik Hong, Daejeon (KR); Seung Mi Lee, Daejeon (KR); Ki Soo Lee, Daejeon (KR); Dong Hoon Jeong, Daejeon (KR); Eun Young Shin, Daejeon (KR); Chang-Hwan Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 110 days.

(21) Appl. No.: 15/320,193

(22) PCT Filed: Jul. 17, 2015

(86) PCT No.: PCT/KR2015/007459
§ 371 (c)(1),
(2) Date: Dec. 19, 2016

(87) PCT Pub. No.: WO2016/010400
PCT Pub. Date: Jan. 21, 2016

(65) Prior Publication Data
US 2018/0208693 A1    Jul. 26, 2018

(30) Foreign Application Priority Data

Jul. 18, 2014  (KR) .................. 10-2014-0091055
Jul. 16, 2015  (KR) .................. 10-2015-0100965

(51) Int. Cl.
| | | |
|---|---|---|
| C08F 210/16 | (2006.01) | |
| C08F 210/02 | (2006.01) | |
| C08F 210/08 | (2006.01) | |
| C08F 4/6592 | (2006.01) | |
| C08J 5/18 | (2006.01) | |
| C08F 4/64 | (2006.01) | |
| C08F 4/659 | (2006.01) | |

(52) U.S. Cl.
CPC .............. *C08F 210/16* (2013.01); *C08F 4/64* (2013.01); *C08F 210/02* (2013.01); *C08J 5/18* (2013.01); *C08F 4/6592* (2013.01); *C08F 4/65912* (2013.01); *C08F 4/65916* (2013.01); *C08F 4/65925* (2013.01); *C08F 2420/02* (2013.01); *C08F 2800/20* (2013.01); *C08J 2323/08* (2013.01)

(58) Field of Classification Search
CPC ..... C08F 210/02; C08F 210/08; C08F 210/16
See application file for complete search history.

(56) References Cited

U.S. PATENT DOCUMENTS

| | | |
|---|---|---|
| 4,464,426 A | 8/1984 | Anthony |
| 6,197,909 B1 | 3/2001 | Smith et al. |
| 6,204,328 B1 | 3/2001 | Sanpei et al. |
| 8,476,392 B2 | 7/2013 | Kolb et al. |
| 8,552,125 B2 | 10/2013 | Slawinski |
| 8,716,415 B2 | 5/2014 | Kim et al. |
| 2006/0177675 A1 | 8/2006 | Lehtinen et al. |
| 2010/0121006 A1 | 5/2010 | Cho et al. |
| 2010/0160579 A1 | 6/2010 | Yang et al. |
| 2012/0259077 A1 | 10/2012 | Ha et al. |
| 2016/0304637 A1 | 10/2016 | Lee et al. |

FOREIGN PATENT DOCUMENTS

| | | |
|---|---|---|
| JP | 0987330 A | 3/1997 |
| KR | 10-1987-0002013 B1 | 11/1987 |
| KR | 10-2010-0028317 A | 3/2010 |
| KR | 10-0964093 B1 | 6/2010 |
| KR | 10-2010-0102854 A | 9/2010 |
| KR | 10-2011-0043464 A | 4/2011 |
| KR | 10-2011-0103958 A | 9/2011 |
| KR | 10-2012-0029162 A | 3/2012 |
| KR | 10-2012-0106812 A | 9/2012 |
| KR | 10-2013-0051467 A | 5/2013 |
| KR | 10-1299375 B1 | 8/2013 |
| WO | 98/54257 A1 | 12/1998 |
| WO | 2005/002744 A1 | 1/2005 |

*Primary Examiner* — Caixia Lu
(74) *Attorney, Agent, or Firm* — Dentons US LLP

(57) ABSTRACT

The present invention relates to ethylene-1-hexene-1-butene terpolymer and a film including the same. The ethylene-1-hexene-1-butene terpolymer according to the present invention has an optimized range of density and melt index and includes 1-hexene and 1-butene as comonomers, and can provide a polymer showing excellent properties by regulating the content ratio of the comonomers in a certain range. Therefore, the film prepared by using the same can be usefully used because it has excellent stickiness, processibility, and falling dart impact strength which are especially suitable for stretch films.

13 Claims, 1 Drawing Sheet

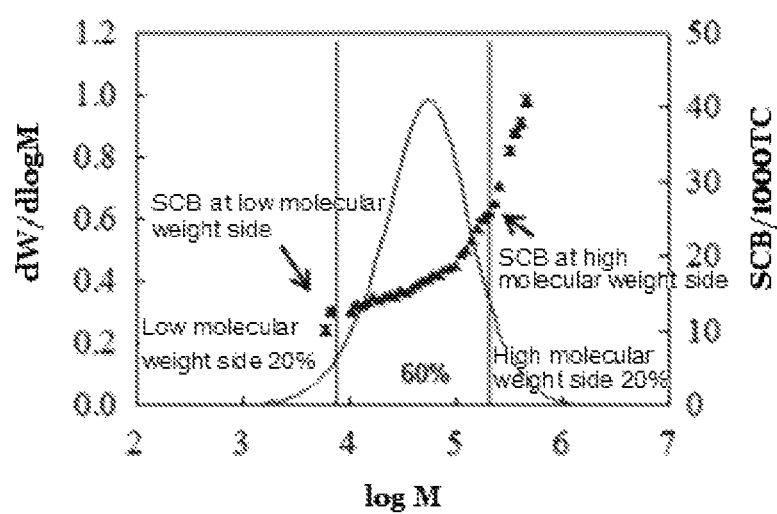

ETHYLENE-1-HEXENE-1-BUTENE
TERPOLYMER AND A FILM INCLUDING
THE SAME

This application is a National Stage Entry of International Application No. PCT/KR2015/007459, filed on Jul. 17, 2015, and claims the benefit of and priority to Korean Application No. 10-2014-0091055, filed on Jul. 18, 2014, and Korean Application No. 10-2015-0100965, filed on Jul. 16, 2015, all of which are hereby incorporated by reference in their entirety for all purposes as if fully set forth herein.

BACKGROUND OF THE INVENTION (a) Field of the Invention

This application claims priority to Korea Patent Application Nos. 10-2014-0091055 filed Jul. 18, 2014 and 10-2015-0100965 filed Jul. 16, 2015 which are all hereby incorporated by reference in their entirety into this application.

The present invention relates to an ethylene-1-hexene-1-butene terpolymer and a film including the same. More specifically, the present invention relates to an ethylene-1-hexene-1-butene terpolymer which is superior in various properties such as adhesive power and falling dart impact strength and suitable for a stretch film, and a film including the same.

(b) Description of the Related Art

Generally, polymer film means a non-fibriform planar plastic article having the thickness of 0.25 mm (1/100 inch) or less. Polymer is widely being used in almost every field related to packaging materials, daily supplies, vehicles, electronics, airplanes, and so on because of its light weight, good barrier property, excellent transparency, and relatively cheap cost, and it is easy to be made into a film because of its good formability. And now, various synthetic polymers such as polyethylene, polypropylene, polyvinylchloride, polyethyleneterephthalate, and so on are developed and being used in a form of film at home and abroad, and a large number of synthetic polymers are being used as materials for film by itself or by blend.

Particularly, polyethylene is classified into low density polyethylene (LDPE), high density polyethylene (HDPE), and linear low density polyethylene (LLDPE) according to density, copolymerization, and kinds of branch, and various polyethylene products are produced even by metallocene catalyst systems recently commercialized.

Low density polyethylene is one of general purpose resins that has been used as an insulating material for military radar because of its excellent electric properties and widened the usage with various packaging materials as the center. LDPE is mainly used for general packaging, agriculture, shrink film, paper coating, and so on, and is particularly suitable for coating because it has long chain branch and has excellent melt strength.

Linear low density polyethylene is a resin that is prepared by copolymerizing ethylene and alpha olefin at low pressure by using a polymerization catalyst, and has narrow molecular distribution and a certain length of short chain branch without a long chain branch. Linear low density polyethylene film has high breaking strength and elongation and is superior in tearing strength, falling dart impact strength, and so on in addition to the properties of general polyethylene, and thus it is increasingly being used for stretch film, overwrap film, and so on to which common LDPE or HDPE is difficult to be applied.

In such linear low density polyethylene, breaking strength, tearing strength, falling dart impact strength, and so on which are important demand properties of a film are largely influenced by alpha olefin, and 1-butene, 1-hexene, 1-octene, and so on may be used as the alpha olefin.

It is generally known that the properties of linear low density polyethylene are good when 1-octene is used but to use 1-octene is disadvantageous in terms of economics because 1-octene comonomer is expensive. Meanwhile, in the case of stretch films requiring adhesive power, it is required to use a considerable low density polyethylene. Meanwhile, it is known that it is most advantageous for obtaining low density polyethylene to use 1-butene as the comonomer in a slurry loop process that is one of common processes for polymerizing polyethylene. However, 1-butene is inferior to other comonomers in properties and thus there are many industrial demands for preparing a LLDPE product having lower density by using comonomers other than 1-butene.

Therefore, with this background, it is continuously needed to prepare more excellent products balanced between various properties and economics, and improvement on this is more needed.

SUMMARY OF THE INVENTION

In order to resolve the problems of prior technologies, the present invention provides an ethylene-1-hexene-1-butene terpolymer having an excellent property balance.

The present invention also provides a film including the ethylene-1-hexene-1-butene terpolymer.

One aspect of the present invention for achieving the purpose provides an ethylene-1-hexene-1-butene terpolymer of which CI (Co-monomer Incorporation) Index is 0.5 to 5; density is 0.900 to 0.916 g/cm$^3$; melt index (MI) measured according to ASTM D1238 at 190° C. and 2.16 kg load condition is 2.0 to 5.0 g/10 mins; and weight ratio of 1-hexene to 1-butene is 1 to 5.

Another aspect of the present invention for achieving the purpose provides a film including the ethylene-1-hexene-1-butene terpolymer.

The ethylene-1-hexene-1-butene terpolymer according to the present invention has an optimized range of CI Index, density, and melt index and includes 1-hexene and 1-butene as comonomers, and can provide a polymer having low density and showing excellent properties by regulating the content ratio of the comonomers in a certain range. Therefore, the film prepared by using the same can be usefully used because it has excellent adhesive power, processibility, and falling dart impact strength which are especially suitable for stretch films.

BRIEF DESCRIPTION OF THE DRAWINGS

FIG. 1 is a graph showing an example of method for measuring the CI Index by using a molecular weight distribution curve.

DETAILED DESCRIPTION OF THE EMBODIMENTS

The present invention can be variously modified and have various examples, and specific examples of the present invention are explained in this description. However, it is not intended to limit the present invention to the specific examples and it must be understood that the present invention includes every modifications, equivalents, or replacements included in the idea and technical scope of the present invention.

Hereinafter, the present invention is explained in more detail.

One aspect of the present invention provides an ethylene-1-hexene-1-butene terpolymer of which CI (Co-monomer Incorporation) Index represented by the following Equation 1 is 0.5 to 5; density is 0.900 to 0.916 g/cm$^3$; melt index (MI) measured according to ASTM D1238 at 190° C. and 2.16 kg load condition is 2.0 to 5.0 g/10 mins; and weight ratio of 1-hexene to 1-butene is 1 to 5.

CI Index=(SCB content at high molecular weight side−SCB content at low molecular weight side)/(SCB content at low molecular weight side)  (Equation 1)

The CI (Co-monomer Incorporation) Index of the ethylene-1-hexene-1-butene terpolymer of the present invention, calculated by Equation 1, may be about 0.5 to about 5, or about 1.0 to about 5, or about 1.5 to about 5.

The CI structure disclosed in the present description means a structure of that the comonomers like alpha olefins is concentrated at high molecular main chain, namely, it means a new structure of that the content of short chain branch (SCB) gets larger toward higher molecular weight side.

The molecular weight, the molecular weight distribution, and the SCB content can be continuously measured at the same time by using a GPC-FTIR apparatus, and the CI Index can be calculated by Equation 1 after measuring the SCB contents (the content of C2-C7 branches per 1000 carbons, unit: ea/1,000 C) at the left boundary and the right boundary of the middle range that occupies 60% of the whole area except the right 20% of the area and the left 20% of the area in the molecular weight distribution graph obtained by plotting log value of molecular weight M (log M) on x axis against the molecular weight distribution to the log value (dwt/dlog M) on y axis. At this time, the SCB content at high molecular weight side and the SCB content at low molecular weight side mean the SCB content values at the left boundary and the right boundary of the middle 60% range except the right 20% and the left 20% of the area.

An example of the method for measuring such CI Index is as illustrated in FIG. 1.

CI Index=(SCB content at high molecular weight side−SCB content at low molecular weight side)/(SCB content at low molecular weight side)  (Equation 1)

At this time, CI Index of 0 or less indicates a non-CI structure polymer and CI Index lager than 0 indicates a CI structure polymer, and larger CI Index can be evaluated as superior in CI characteristic.

The terpolymer according to the present invention includes both of 1-hexene and 1-butene as comonomers in addition to ethylene.

The weight ratio of 1-hexene to 1-butene in the comonomers may be about 1 to about 5, preferably about 1.5 to about 3.5, and more preferably about 2.0 to about 3.5.

And, according to one embodiment of the present invention, the content of 1-hexene and 1-butene to the total weight of the ethylene-1-hexene-1-butene terpolymer may be about 5 to about 15 wt %, and preferably about 8 to about 13 wt %.

When the total content and the weight ratio of 1-hexene and 1-butene satisfy said ranges, a low density polyethylene can be obtained by decreasing the density of the copolymer without decrease in other properties, and an excellent adhesive power of about 8 kgf/mm or more can be realized.

The terpolymer according to the present invention may have the density of about 0.900 to about 0.916 g/cm$^3$, preferably about 0.900 to about 0.915 g/cm$^3$, and more preferably about 0.905 to about 0.915 g/cm$^3$. When the density of the ethylene-1-hexene-1-butene terpolymer is in the range, excellent adhesive power and falling dart impact strength can be realized.

The density of polyolefin is generally influenced by the amount of alpha olefin comonomers used. Namely, the density decreases when the amount of alpha olefin comonomers used is large, and the density increases when the amount of alpha olefin comonomers used is small. However, it is not easy to realize various properties, including the density, which are suitable for a stretch film just by the amount of comonomers used.

Therefore, the present invention provides terpolymer including 1-hexene and 1-butene as comonomers, and realizes the properties suitable for a film such as low density and excellent processibility, adhesive power, and falling dart impact strength and so on, by optimizing the content and the relative weight ratio of 1-hexene and 1-butene as disclosed above.

Furthermore, the melt index (MI) of the ethylene-1-hexene-1-butene terpolymer according to the present invention, measured at 190° C. and 2.16 kg load condition, may be about 2.0 to about 5.0 g/10 min, preferably about 2.5 to about 4.5 g/10 min, and more preferably about 2.5 to about 3.5 g/10 min. It may be preferable as the optimum point where the moldability and the mechanical property are harmonized that the melt index is in said range.

According to one embodiment of the present invention, the weight average molecular weight of the terpolymer of the present invention may be about 50,000 to about 150,000 g/mol, preferably about 60,000 to about 120,000 g/mol, and more preferably about 60,000 to about 100,000 g/mol, but it is not limited to or by this.

And, according to one embodiment of the present invention, the molecular weight distribution (weight average molecular weight/number average molecular weight) of the terpolymer of the present invention may be about 1.5 to about 5, preferably about 2.5 to about 4, and more preferably about 2.5 to about 3.5, but it is not limited to or by this.

The ethylene-1-hexene-1-butene terpolymer according to the present invention has low density and excellent processibility, adhesive power, and falling dart impact strength. Therefore, it is suitable for film, and particularly can be usefully used to produce a stretch film.

The terpolymer according to the present invention can be prepared according to the preparation method disclosed below, for example, but it is not limited to or by this.

According to one embodiment of the present invention, the ethylene-1-hexene-1-butene terpolymer may be prepared in the presence of a supported metallocene catalyst. More specifically, the terpolymer may be prepared by copolymerizing ethylene, 1-hexene, and 1-butene in the presence of the supported metallocene catalyst that is composed of an outer layer including the area from each surface to ⅓ position of the particle diameter toward the center and an inner layer including the rest area from ⅓ position of the particle diameter to the center, in the cross-section of the supported catalyst particle, and includes the silica carrier on whose inside and surface the alkylaluminoxane is loaded; and one or more metallocene compounds loaded on the silica carrier, wherein the content ratio (wt %) of Al/Si elements of the inner layer is 65% or more compared to the content ratio (wt %) of Al/Si elements of the outer layer In the present description, the supported catalyst particle includes the silica carrier on which the alkylaluminoxane, a cocatalyst, is loaded. Furthermore, in the cross-section of the supported catalyst particle, the area from the surface to ⅓ position of the diameter toward the center of the particle is defined as the outer layer, and the rest area from ⅓ position of the diameter to the center, namely, the area including the rest inner ⅔ portion of the particle, is defined as the inner layer. Therefore, the inner layer includes the area of the inside of 70% of the longest radius of the particle, from the center of the silica carrier, and the outer layer includes the rest outer area of the silica carrier, in the supported metallocene catalyst.

Furthermore, the inside of the silica carrier disclosed in this description includes pores. Furthermore, the 'moisture content' of the carrier is defined as the percentage of the weight of moisture included in the carrier per the total weight of the carrier unless there is no particular mention about this.

Furthermore, the supported metallocene catalyst of the present invention means a catalyst on which one or more metallocene catalysts are supported. And, the supported metallocene catalyst of the present invention may further include a borate compound as a second cocatalyst.

The supported metallocene catalyst is characterized in that larger amount of the alkylaluminoxane than the existing one is penetrated into and chemically bonded to the inside and the pores of the silica carrier and a respectable amount of the same is physically bonded to the surface of the carrier. Namely, there was a small amount of the alkylaluminoxane that was penetrated into and chemically bonded to the inside of the carrier in the past. However, the present invention makes more cocatalyst is loaded on the inside of the inner layer than the existing one by the method of dividedly loading the alkylaluminoxane on the carrier. Therefore, in this structure of the supported metallocene catalyst of the present invention, a large amount of the alkylaluminoxane is included in the inner layer, and thus it can improve the bulk density in comparison to the existing one and the catalytic activity can be easily controlled.

In the supported metallocene catalyst having such characteristics, the content ratio (wt %) of Al/Si elements of the inner layer is 65% or more, or preferably 90 to 150%, compared to the content ratio (wt %) of Al/Si elements of the outer layer. It means that the large amount of the alkylaluminoxane is deeply penetrated into the inner layer of the silica carrier.

The metallocene compound may be one or more metallocene compounds disclosed below which are well known in the related art.

The method of preparing the supported metallocene catalyst includes the steps of: preparing a silica carrier; loading an alkylaluminoxane, a cocatalyst component, on the inside and the surface of the silica carrier by bringing the silica carrier into contact with the alkylaluminoxane; and sequentially loading one or more metallocene compounds on the silica carrier on which the alkylaluminoxane is loaded, wherein the alkylaluminoxane may be dividedly loaded at different temperatures by a separate-input method.

Namely, the preparation method of the supported metallocene catalyst is characterized in that the cocatalyst is dividedly loaded on the silica carrier and the loading temperature is different in the preparation of the supported metallocene catalyst in order that relatively large amount of the cocatalyst is distributed on the inside of the carrier.

According to this method, the supported metallocene catalyst having a specific parameter about the content of Al/Si in the carrier can be provided. Preferably, it is possible to provide the supported metallocene catalyst that is composed of the outer layer including the area from each surface to ⅓ position of the particle diameter toward the center and the inner layer including the rest area from ⅓ position of the particle diameter to the center, in the cross-section of the supported catalyst particle, and includes the silica carrier on whose inside and surface the alkylaluminoxane is loaded; and one or more metallocene compounds loaded on the silica carrier, wherein the content ratio (wt %) of Al/Si elements of the inner layer is 65% or more compared to the content ratio (wt %) of Al/Si elements of the outer layer.

Hereinafter, the steps which may be included in the method are explained in more detail.

Firstly, the silica carrier is prepared. According to one embodiment, the silica carrier having a morphology suitable to Phillips loop slurry process may be selected. The combination of the metallocene catalyst and the alkylaluminoxane, the cocatalyst, loaded on the carrier can be optimized by selectively controlling the amount of silanol groups and siloxane groups of the silica carrier through calcination conditions.

Furthermore, in order that the cocatalyst (for example, MAO) is penetrated into the silica owing to the decrease in viscosity at high temperature, chemically reacted with —OH groups of the silica, and physically adsorbed onto the surface of the silica, the calcination may be carried out in the temperature range from the temperature where moisture disappears from the surface of the silica to the temperature where —OH groups are completely disappear from the surface of the silica. According to a preferable embodiment, the calcination of the silica carrier may be carried out at the temperature of 100 to 700° C. The moisture content of the silica carrier after the calcination is preferably 0.1 to 7 wt %.

Furthermore, the surface of the carrier may include 0.5 to 5 mmol/g of hydroxy group, or preferably 0.7 to 2 mmol/g of hydroxy group, as the carrier shows the moisture content of the range disclosed above.

The carrier may be one or more carriers selected from the group consisting of silica, silica-alumina and silica-magnesia, and preferably it may be silica. Above this, any carrier satisfying said moisture content range may be used without limitations.

Furthermore, the carrier may show more improved activity by treating the surface of the carrier with a small quantity of trialkylaluminum with necessity.

The trialkylaluminum may be one or more compounds selected from the group consisting of trimethylaluminum (TMA1), triethylaluminum (TEA1), and tributylaluminum (TBA1), and preferably it may be triethylaluminum (TEA1).

Furthermore, a solvent may be used for inducing a smooth contact reaction between the carrier and the trialkylaluminum in the step of treating the surface of the carrier, but the reaction may be carried out without the solvent.

Most organic solvents such as an aliphatic hydrocarbon like hexane, pentane, and heptane; an aromatic hydrocarbon like toluene and benzene; a chlorinated hydrocarbon like dichloromethane; an ether like diethylether and tetrahydrofuran; acetone; ethylacetate; and so on may be used as the solvent. Preferably, hexane, heptane, toluene, or dichloromethane may be used as the solvent. And, the step of treating the surface of the carrier may be carried out at the temperature of 0 to 120° C., preferably 10 to 100° C., and more preferably 30 to 90° C., in the aspect of improving the process efficiency.

Furthermore, the amount of the trialkylaluminum reacted with the surface of the carrier in above step is not limited particularly, but the step may be carried out to make the mole ratio of the alkylaluminoxane to the trialkyl aluminum 1:10 to 1:20, preferably 1:12 to 1:18, in the relationship with the alkylaluminoxane disclosed below. Namely, the mole ratio of the alkylaluminoxane to the trialkyl aluminum is preferably 1:10 or more for the proper reaction with the moisture in the surface of the carrier, and the mole ratio is preferably 1:20 or less in order not to eliminate the silanol groups in the surface of the carrier that reacts with the alkylaluminoxane.

According to one embodiment of the present invention, the additional step of treating the surface of the carrier may be carried out by the method of mixing the carrier and the solvent in a reactor, adding the trialkylaluminum thereto, and carrying out the reaction thereof at the temperature range disclosed above for 30 mins to 3 hrs with stirring. However, the present invention is not limited to this.

Meanwhile, the preparation method of the supported metallocene catalyst includes the step of loading the alkylaluminoxane on the inside and the surface of the silica carrier by bringing the silica carrier into contact with the alkylaluminoxane, a cocatalyst component.

Particularly, the preparation method of the supported metallocene catalyst according to one embodiment of the present invention is characterized in loading the alkylaluminoxane dividedly on the silica carrier at different temperatures with varying the temperature from high to low.

Namely, the alkylaluminoxane may be loaded on the silica carrier by the separate-input method of primarily loading a part of the whole input of the alkylaluminoxane at the higher temperature and secondarily loading the rest of the whole input of the same at the lower temperature. The higher temperature may include the range of 50° C. or more, preferably 50 to 150° C., and the lower temperature may include the range of 40 C. or less, or −10° C. to 40° C.

Therefore, according to one embodiment of the present invention, the alkylaluminoxane may be loaded on the silica carrier by the separate-input method of primarily putting a part of the whole input of the alkylaluminoxane at the temperature of 50° C. or more and secondarily putting the rest of the whole input of the same at the temperature of 40° C. or less.

Furthermore, according to the most preferable embodiment of the present invention, the silica carrier on which the alkylaluminoxane is loaded may be obtained by the method of primarily loading 50 to 90 wt % of the whole input of the alkylaluminoxane on the silica carrier and carrying out the former reaction at 50° C. to 150° C., and secondarily loading the rest of the alkylaluminoxane on the silica carrier and carrying out the latter reaction at −10° C. to 40° C.

More specifically, the present invention brings the silica obtained in above step into contact with the alkylaluminoxane, the cocatalyst. At this time, the contacting method according to one embodiment of the present invention makes more alkylaluminoxane is penetrated into the silica carrier than the existing one and makes a respectable amount of the alkylaluminoxane is loaded on the surface of the same, as disclosed above. According to this method, the silica carrier that is composed of the inner layer and the outer layer surrounding the same and includes the alkylaluminoxane loaded on its inside and surface is provided.

The preparation method of the supported metallocene catalyst according to one embodiment of the present invention is characterized in that the alkylaluminoxane and the silica carrier come in contact with each other in advance at high temperature condition where the chemical attachment is predominant and the reactant decreases in viscosity and is easily diffused into the pores inside the silica, and the alkylaluminoxane comes in contact with the silica at low temperature in addition so that the cocatalyst component is physically adsorbed and loaded onto the surface of the silica, in order to increase the cocatalyst content inside the silica. Therefore, in one embodiment of the present invention, the bulk density of the polymer and the catalytic activity may be controlled not only by the amount of the alkylaluminoxane and the contact temperature but also by the method of loading the same thereon.

In the process of loading the alkylaluminoxane, as disclosed above, a method of loading the alkylaluminoxane at the higher temperature and the lower temperature dividedly twice or more is used. For example, the alkylaluminoxane may be dividedly loaded twice. In the first loading process, the former reaction may be carried out in the temperature range of 50° C. to 150° C. And, in the second loading process, the latter reaction may be carried out in the temperature range of −10° C. to 40° C. with dividedly putting the rest of the alkylaluminoxane therein for loading the same. Furthermore, 50 to 90 wt % of the whole input of the alkylaluminoxane is loaded in the first loading process, and the rest is loaded in the second loading process.

At this time, if the alkylaluminoxane, the cocatalyst, is not dividedly loaded but at once, the alkylaluminoxane is unevenly loaded on the carrier and aluminum exists excessively on the surface of the carrier. Whereas, the metallocene compound of small molecular size is evenly loaded on the inside and the surface of the carrier. Therefore, if the alkylaluminoxane is loaded at once, the total catalytic activity decreases because the metallocene compound loaded on the inside of the carrier is not activated, and, accordingly, there is a problem of the decrease in the bulk density of the prepared polymer because the polymerization is carried out by the catalyst activated only at the surface.

Meanwhile, the alkylaluminoxane is a cocatalyst for assisting the activity of the metallocene catalyst disclosed bellow.

Said step may be carried out by mixing and reacting the carrier and the alkylaluminoxane in the presence or absence of the solvent with stirring.

Here, the alkylaluminoxane may be one or more compounds selected from the group consisting of methylaluminoxane, ethylaluminoxane, butylaluminoxane, and isobutylaluminoxane.

The amount of the alkylaluminoxane loaded on the silica carrier in above step may be 5 to 15 mmol/g based on 1 g of the silica carrier. Namely, the former reaction and the latter reaction of the alkylaluminoxane may be carried out with dividedly loading the alkylaluminoxane at the higher temperature and the lower temperature, within above amount of the alkylaluminoxane loaded.

At this time, a solvent may be used in above step for inducing a smooth contact reaction between the carrier and the alkylaluminoxane but the reaction may also be carried out without the solvent.

Most organic solvents such as an aliphatic hydrocarbon like hexane, pentane, and heptane; an aromatic hydrocarbon like toluene and benzene; a chlorinated hydrocarbon like dichloromethane; an ether like diethylether and tetrahydrofuran; acetone; ethylacetate; and so on may be used as the solvent. Preferably, hexane, heptane, toluene, or dichloromethane may be used as the solvent.

By above process, the present invention can provide the silica carrier of which the inside is penetrated by more cocatalyst (the alkylaluminoxane) than the existing one and the outside is attached by a respectable amount of the cocatalyst (the alkylaluminoxane).

Meanwhile, the preparation method of the supported metallocene catalyst according to the present invention includes the step of sequentially loading one or more metallocene compounds on the silica carrier on which the alkylaluminoxane is loaded.

The present invention loads one or more metallocene compounds sequentially on the silica carrier on which the alkylaluminoxane is loaded by above method and optimizes the interaction with the cocatalyst already loaded on the carrier according to the reaction condition of each metallocene compound for controlling the catalytic characteristics. It can be recognized by looking into the depth profile of the catalyst carrier with SEM/EDS analysis method that the amount of the alkylaluminoxane loaded on the inside and the surface of the silica carrier in the supported metallocene catalyst prepared by above method is controlled.

Furthermore, the productivity of polyolefin can be largely improved when a polyolefin is prepared by using the supported metallocene catalyst because the bulk density and the catalytic activity thereof are increased.

The metallocene compound is the main component which can exhibit the activity as the catalyst in company with the alkylaluminoxane disclosed above.

Above step may be carried out by the method of reacting the carrier and the metallocene compound with mixing and stirring the same in the presence of a solvent.

At this time, the amount of the metallocene compound loaded on the silica carrier in above step may be 0.01 to 1 mmol/g based on 1 g of the silica carrier. Namely, it is preferable that the amount is in said range in consideration of the contribution effect of the metallocene compound on the catalytic activity.

Furthermore, the temperature condition is not limited particularly in the step of loading the metallocene compound.

Meanwhile, one or more metallocene compounds may be used without limitations if they are conventional in the technical field to which the present invention pertains. For example, the metallocene compound may be 1) a metallocene compound including the combination of a non bridge Cp and a Cp type, 2) a metallocene compound including the combination of a Si bridge Cp and a Cp type, 3) a metallocene compound including the combination of a C bridge Cp and a Cp type, 4) a metallocene compound including the combination of a Si bridge Cp and an amine type, 5) a metallocene compound including the combination of an ethylene bridge Cp and a Cp type, 6) a metallocene compound including the combination of a phenylene bridge Cp and an amine type, and 7) a metallocene compound including a C—C bridge, a Si—C bridge, or a Si—Si bridge. The Cp may be cyclopentadienyl, indenyl, fluorenyl, indenoindole (InIn), and so on, and the structure is not limited. Furthermore, said Si-based bridge may include t-butoxy-hexyl substituent and a similar structure thereof, and the indene structure may include tetrahydro-indene structure. Furthermore, the metallocene compound of the present invention includes a low molecular weight metallocene compound (a Cp type) and a high molecular weight metallocene compound (for example, a CGC type or an ansa type).

As a preferable example of the metallocene compound, there may be one or more compounds selected from the group consisting of the compounds represented the following Chemical Formulae 1 to 5:

$(Cp^1R^a)_n(Cp^2R^b)M^1Z^1_{3-n}$ (Chemical Formula 1)

in Chemical Formula 1, $M^1$ is a group 4 transition metal;

$Cp^1$ and $Cp^2$ are, same to or different from each other, independently any one selected from the group consisting of cyclopentadienyl, indenyl, 4,5,6,7-tetrahydro-1-indenyl, and fluorenyl radical, and they may be substituted with a C1-C20 hydrocarbon;

$R^a$ and $R^b$ are, same to or different from each other, independently hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl;

$Z^1$ is a halogen atom, a C1-C20 alkyl, a C2-C10 alkenyl, a C7-C40 alkylaryl, a C7-C40 arylalkyl, a C6-C20 aryl, a substituted or non-substituted C1-C20 alkylidene, a substituted or non-substituted amino group, a C2-C20 alkylalkoxy, or a C7-C40 arylalkoxy; and n is 1 or 0;

$(Cp^3R^c)_mB^1(Cp^4R^d)M^2Z^2_{3-m}$ (Chemical Formula 2)

in Chemical Formula 2, $M^2$ is a group 4 transition metal;

$Cp^3$ and $Cp^4$ are, same to or different from each other, independently any one selected from the group consisting of cyclopentadienyl, indenyl, 4,5,6,7-tetrahydro-1-indenyl, and fluorenyl radical, and they may be substituted with a C1-C20 hydrocarbon;

$R^c$ and $R^d$ are, same to or different from each other, independently hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl;

$Z^2$ is a halogen atom, a C1-C20 alkyl, a C2-C10 alkenyl, a C7-C40 alkylaryl, a C7-C40 arylalkyl, a C6-C20 aryl, a substituted or non-substituted C1-C20 alkylidene, a substituted or non-substituted amino group, a C2-C20 alkylalkoxy, or a C7-C40 arylalkoxy;

$B^1$ is one or more radicals including carbon, germanium, silicon, phosphorus, or nitrogen atom, or a combination thereof, which crosslink the $Cp^3R^c$ ring and the $Cp^4R^d$ ring or crosslink one $Cp^4R^d$ ring with $M^2$; and m is 1 or 0;

$(Cp^5R^e)B^2(J)M^3Z^3_2$ (Chemical Formula 3)

in Chemical Formula 3, $M^3$ is a group 4 transition metal;

$Cp^5$ is any one selected from the group consisting of cyclopentadienyl, indenyl, 4,5,6,7-tetrahydro-1-indenyl, and fluorenyl radical, and it may be substituted with a C1-C20 hydrocarbon;

$R^e$ is hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl;

$Z^3$ is a halogen atom, a C1-C20 alkyl, a C2-C10 alkenyl, a C7-C40 alkylaryl, a C7-C40 arylalkyl, a C6-C20 aryl, a substituted or non-substituted C1-C20 alkylidene, a substituted or non-substituted amino group, a C2-C20 alkylalkoxy, or a C7-C40 arylalkoxy;

$B^2$ is one or more radicals including carbon, germanium, silicon, phosphorus, or nitrogen atom, or a combination thereof, which crosslink the $Cp^5R^e$ ring with J; and J is any one selected from the group consisting of NR$^f$, O, PR$^f$ and S, and R$^f$ is a C1-C20 alkyl, aryl, substituted alkyl, or substituted aryl,

[Chemical Formula 4]

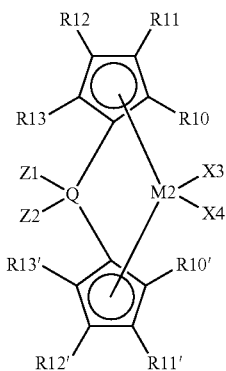

in Chemical Formula 4,

R10 to R13 and R10' to R13' are, same to or different from each other, independently hydrogen, a C1-C20 alkyl group, a C2-C20 alkenyl group, a C6-C20 aryl group, a C7-C20 alkylaryl group, a C7-C20 arylalkyl group, or a C1-C20 amine group, and 2 or more adjacent groups among R10 to R13 and R10' to R13' may be connected to each other and form one or more aliphatic rings, aromatic rings, or hetero rings;

Z1 and Z2 are, same to or different from each other, independently hydrogen, a C1-C20 alkyl group, a C3-C20 cycloalkyl group, a C1-C20 alkoxy group, a C6-C20 aryl group, a C6-C10 aryloxy group, a C2-C20 alkenyl group, a C7-C40 alkylaryl group, or a C7-C40 arylalkyl group;

Q is a C1-C20 alkylene group, a C3-C20 cycloalkylene group, a C6-C20 arylene group, a C7-C40 alkylarylene group, or a C7-C40 arylalkylene group;

M2 is a group 4 transition metal; and

X3 and X4 are, same to or different from each other, independently a halogen, a C1-C20 alkyl group, a C2-C10 alkenyl group, a C6-C20 aryl group, a nitro group, an amido group, a C1-C20 alkylsilyl group, a C1-C20 alkoxy group, or a C1-C20 sulfonate group;

[Chemical Formula 5]

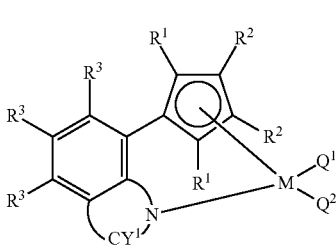

in Chemical Formula 5,

R$^1$ and R$^2$ are, same to or different from each other, independently hydrogen, a C1-C20 alkyl, a C2-C20 alkenyl, a C6-C20 aryl, a C6-C20 silyl, a C7-C20 alkylaryl, a C7-C20 arylalkyl, or a metalloid of a group 4 metal substituted with a hydrocarbyl, and R$^1$ and R$^2$, or two R$^2$s, may be connected to each other and form a ring by an alkylidine including a C1-C20 alkyl or a C6-C20 aryl.

R$^3$ is independently hydrogen, a halogen atom, a C1-C20 alkyl, a C2-C20 alkenyl, a C6-C20 aryl, a C7-C20 alkylaryl, a C7-C20 arylalkyl, a C1-C20 alkoxy, a C6-C20 aryloxy, or an amido, and 2 or more groups among R$^3$s may be connected to each other and form an aliphatic ring or an aromatic ring;

CY$^1$ is a substituted or non-substituted aliphatic or aromatic ring, and the substituent in CY$^1$ is a halogen atom, a C1-C20 alkyl, a C2-C20 alkenyl, a C6-C20 aryl, a C7-C20 alkylaryl, a C7-C20 arylalkyl, a C1-C20 alkoxy, a C6-C20 aryloxy, or an amido, and 2 or more groups of the substituents may be connected to each other and form an aliphatic ring or an aromatic ring when there is a plurality of substituents;

M is a group 4 transition metal; and

Q$^1$ and Q$^2$ are independently a halogen atom, a C1-C20 alkyl, a C2-C20 alkenyl, a C6-C20 aryl, a C7-C20 alkylaryl, a C7-C20 arylalkyl, a C1-C20 alkylamido, a C6-C20 arylamido, or a C1-C20 alkylidene.

At this time, the metallocene compound including the combination of the non bridge Cp and the Cp type may include the compound represented by Chemical Formula 1.

The metallocene compound including the combination of the Si bridge Cp and the Cp type and the metallocene compound including the combination of the C bridge Cp and the Cp type may include the compound represented by Chemical Formula 2.

The metallocene compound including the combination of the Si bridge Cp and the amine type may include the compound represented by Chemical Formula 3.

The metallocene compound including the combination of the ethylene bridge Cp and the Cp type may include the compound represented by Chemical Formula 4.

Furthermore, the hydrocarbyl defined in Chemical Formula 5 is a monovalent functional group of a hydrocarbon from which a hydrogen atom is eliminated, and includes ethyl, phenyl, and so on. And, the metalloid is an element with properties in between those of metals and nonmetals, and it includes arsenic, boron, silicon, tellurium, and so on.

According to one example of the present invention, the compound represented by Chemical Formula 1 may be the compound represented by any one of the following structural formulae, but the present invention is not limited to or by them.

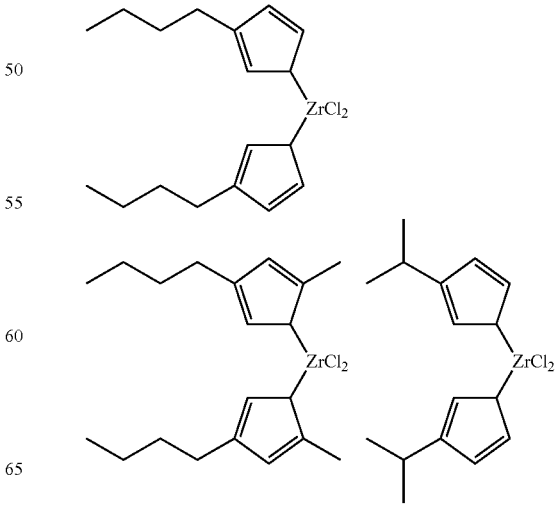

-continued
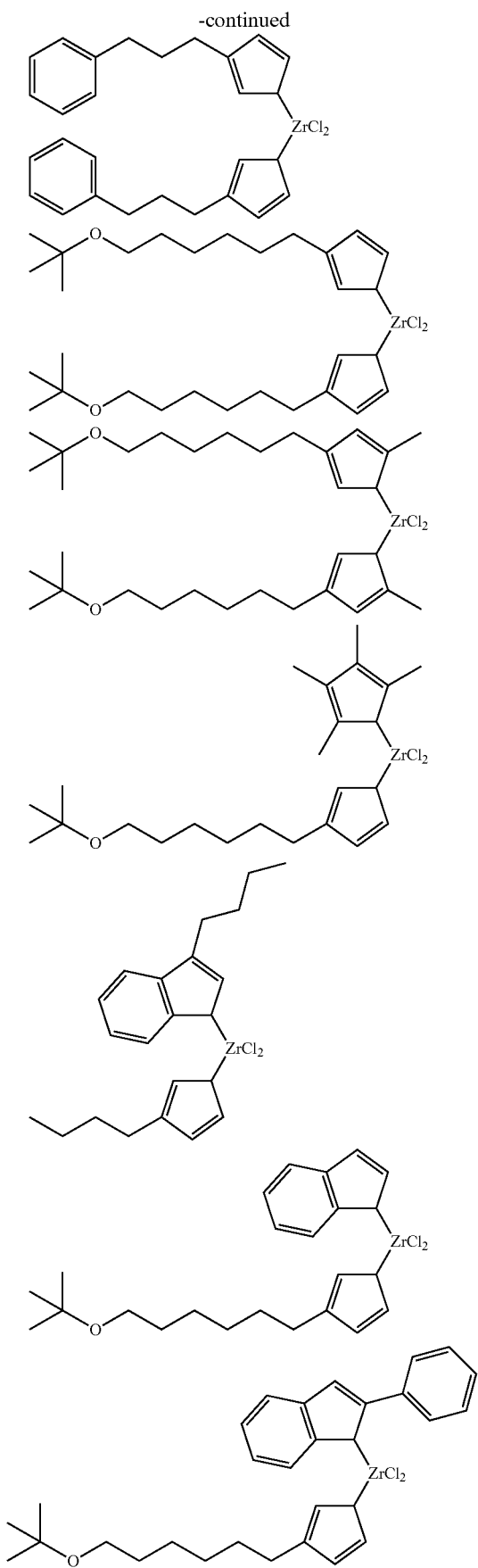
-continued
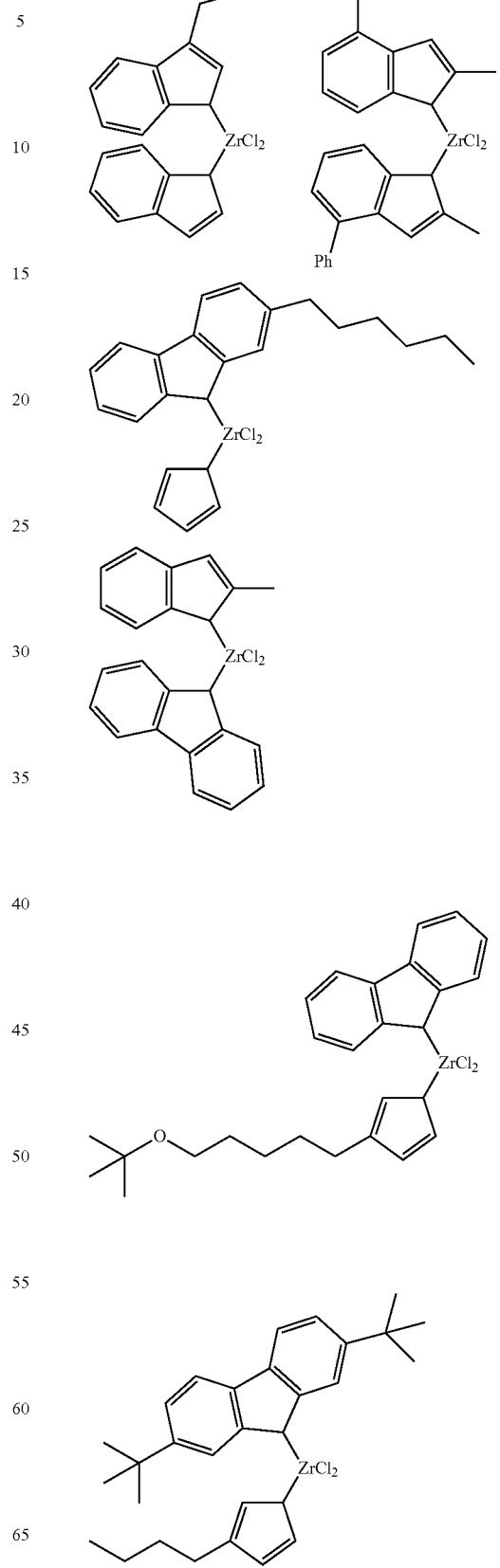

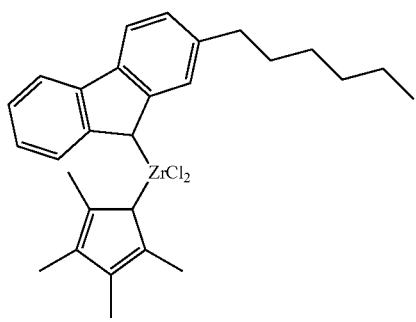
According to one example of the present invention, the compound represented by Chemical Formula 2 may be the compound represented by any one of the following structural formulae, but the present invention is not limited to or by them.
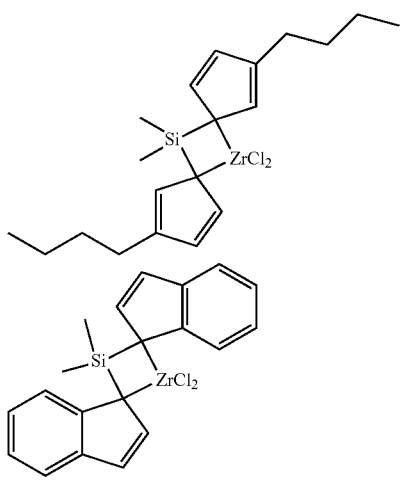
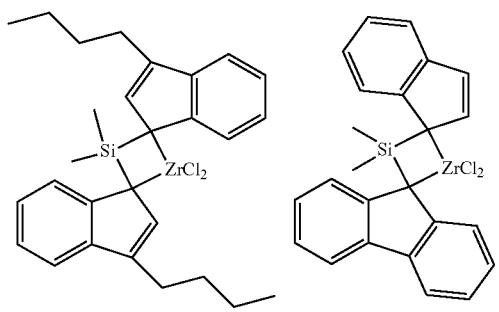
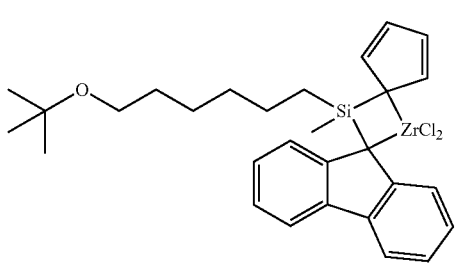
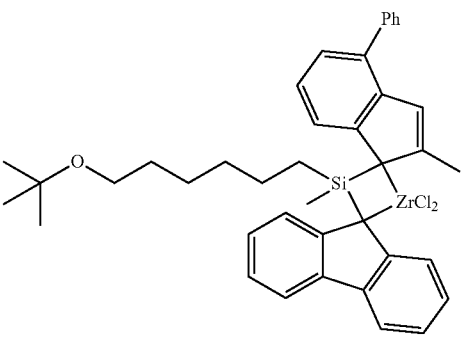
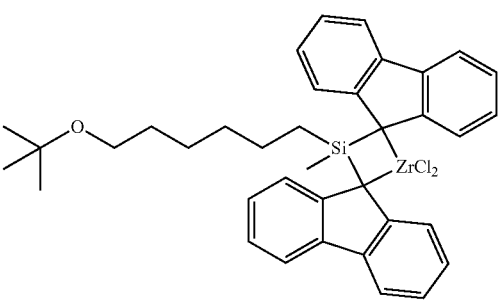
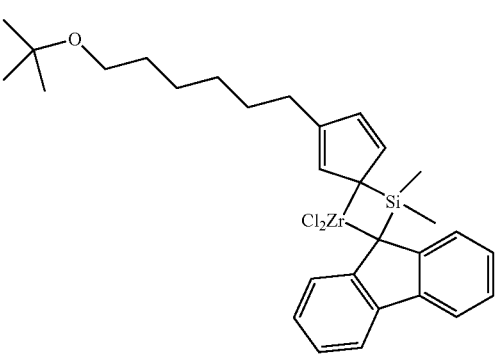
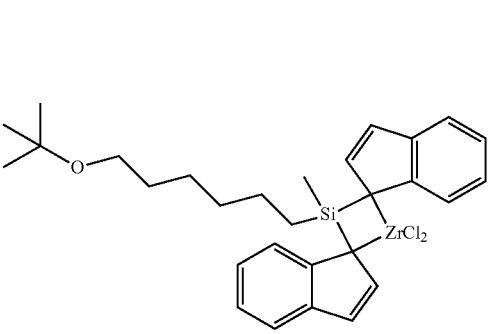
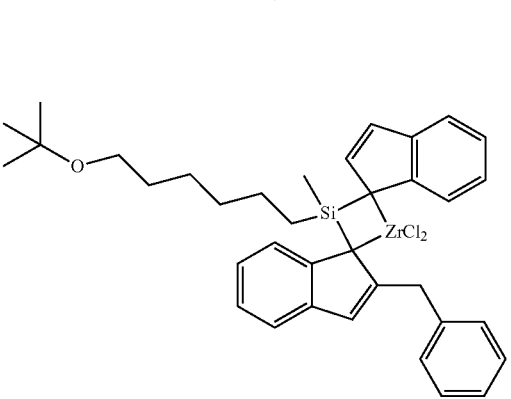

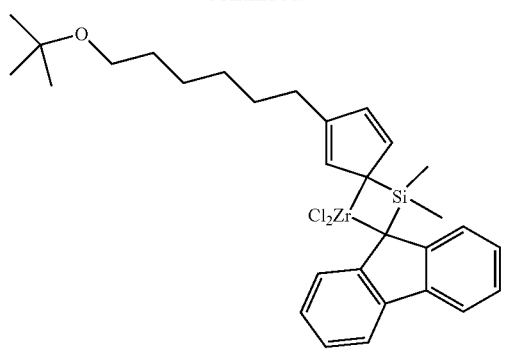
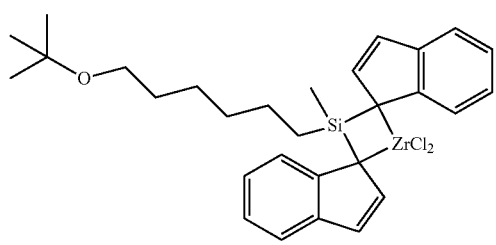
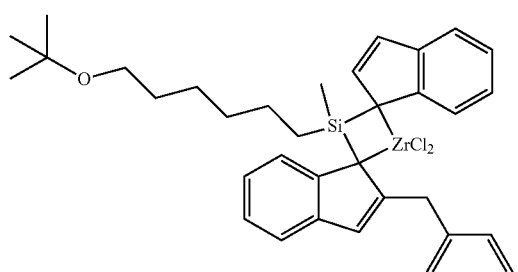
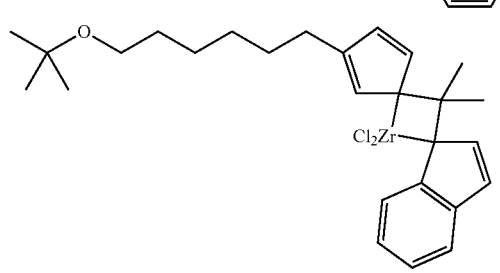
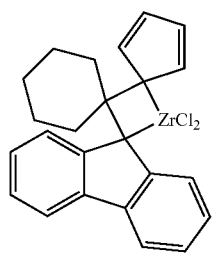
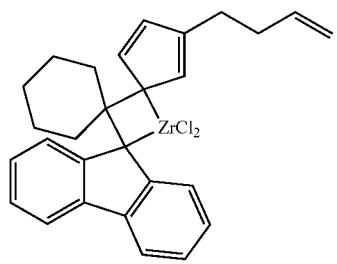
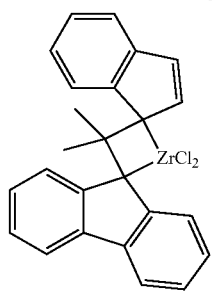
According to one example of the present invention, the compound represented by Chemical Formula 3 may be the compound represented by any one of the following structural formulae, but the present invention is not limited to or by them.
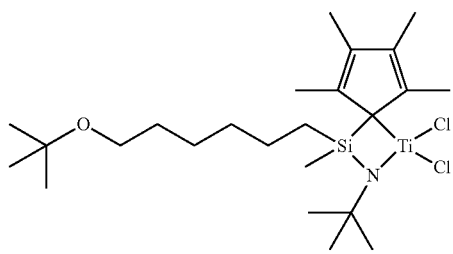
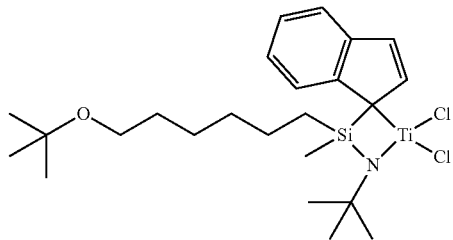
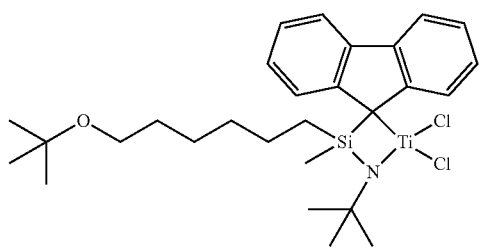
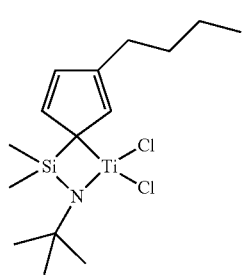

-continued

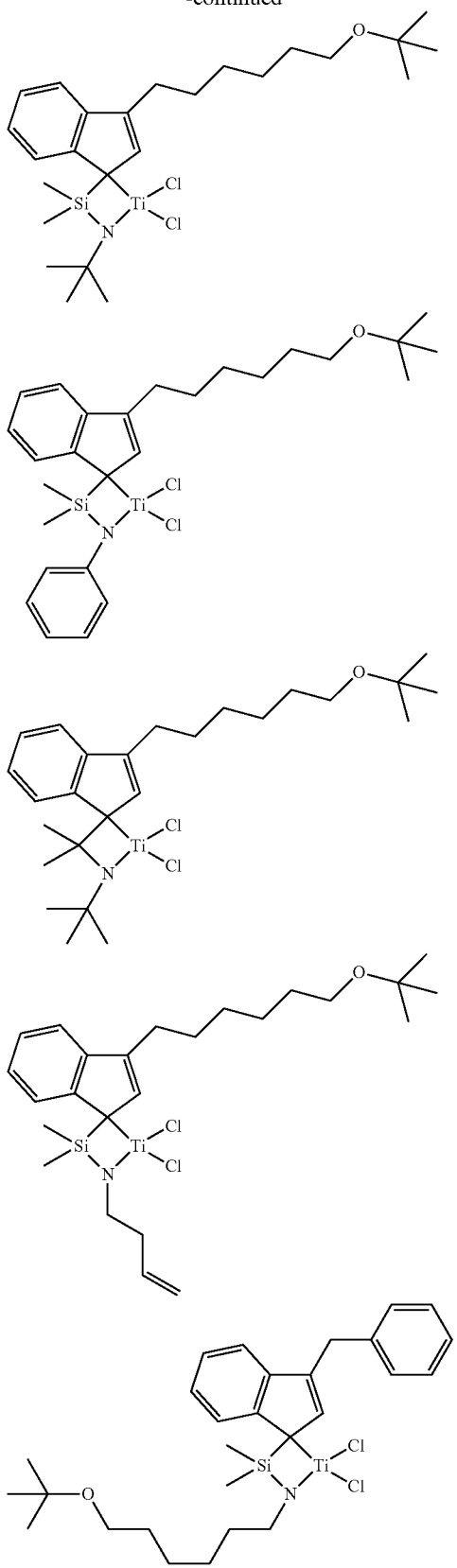

In the supported metallocene catalyst, Q in Chemical Formula 4 may be a C1-C20 alkylene group, Z1 and Z2 may be independently hydrogen, a C1-C20 alkyl group, or a C1-C20 alkoxy group, and X3 and X4 may be a halogen, but it is not limited to or by this.

Furthermore, the compound represented by Chemical Formula 5 may be the compound represented by any one of the following structural formulae, but the present invention is not limited to or by them.

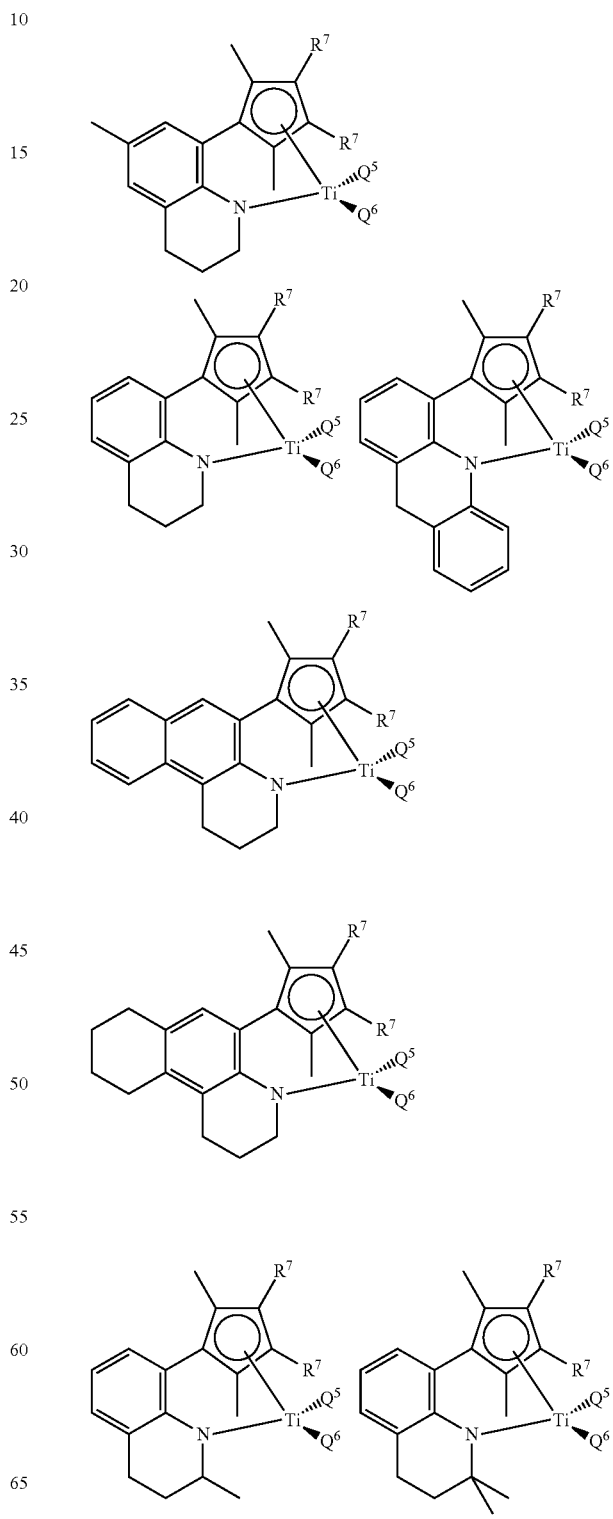

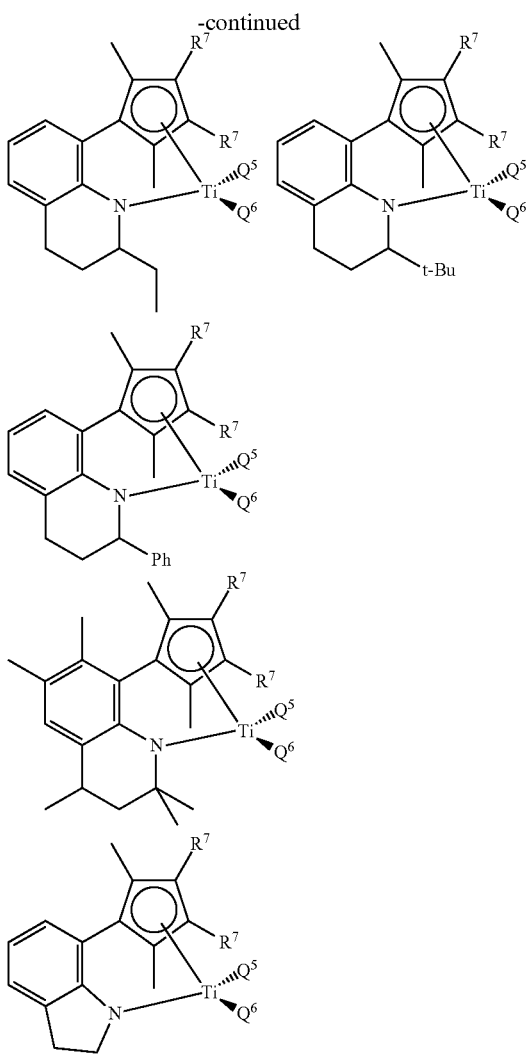

in above structural formulae, $R^7$ may be independently hydrogen or methyl; and $Q^5$ and $Q^6$ may be independently methyl, dimethylamido or chloride.

The metallocene compound represented by Chemical Formula 5 can structurally keep the angle of Cp-M-N narrow and the angle of $Q^1$-M-$Q^2$ wide where monomers approach, because the metal site is connected by the cyclopentadienyl ligand to which the amido group connected to the phenylene bridge in the form of a ring is introduced.

Furthermore, the preparation method of the supported metallocene catalyst according to the present invention may further include a step which can be commonly carried out in the technical field to which the present invention pertains before or after every step, in addition to the steps disclosed above, and the polymerization method of the present invention is not limited to or by the steps.

And, according to a preferable embodiment of the present invention, when one or more metallocene compounds are used, said metallocene compounds may be sequentially loaded on the silica carrier.

And, according to one embodiment of the present invention, the present invention may further load a borate compound as the second cocatalyst on the carrier. Namely, the present invention may further include the step of loading the borate compound as the second cocatalyst on the silica carrier on which the alkylaluminoxane and one or more metallocene compounds are loaded.

Therefore, according to one embodiment of the present invention, it is possible that the alkylaluminoxane, the first cocatalyst, is loaded on the carrier, the borate compound, the second cocatalyst, is loaded thereon, and then one or more metallocene compounds are loaded thereon. If the second cocatalyst is included the supported metallocene catalyst, the polymerization activity of the final catalyst prepared may be improved.

The borate compound, the second cocatalyst, may include a tri-substituted ammonium salt type of borate compound, a dialkyl ammonium salt type of borate compound, or a tri-substituted phosphonium salt type of borate compound. For example of the second cocatalyst, there is a tri-substituted ammonium salt type of borate compound such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(secondary-butyl)ammoniumtetrakis(pentafluorophenyl)borate, N,N-dimethylanilinium tetrakis(pentafluorophenyl)borate, N,N-diethylaniliniumtetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, or N,N-dimethyl-(2,4,6-trimethylanilinium) tetrakis(2,3,4,6-tetrafluorophenyl)borate; a dialkyl ammonium salt type of borate compound such as dioctadecylammonium tetrakis(pentafluorophenyl)borate, ditetradecylammonium tetrakis(pentafluorophenyl)borate, or dicyclohexylammonium tetrakis(pentafluorophenyl)borate; or a tri-substituted phosphonium salt type of borate compound such as triphenylphosphonium tetrakis(pentafluorophenyl)borate, methyldioctadecylphosphonium tetrakis(pentafluorophenyl)borate, or tri(2,6-dimethylphenyl)phosphonium tetrakis(pentafluorophenyl)borate.

And, the borate compound may be loaded in the amount of 0.01 to 1 mmol/g based on 1 g of the silica carrier. And, when the borate compound is used as the second cocatalyst in the present invention, the loading order is not limited particularly. For example, the borate compound may be finally loaded on the silica carrier after loading one or more metallocene compounds on the same. And, selectively, the present invention may be carried out according to the order of loading the alkylaluminoxane on the silica carrier, loading the borate compound, and then loading one more metallocene compounds sequentially.

The ethylene-1-hexene-1-butene terpolymer of the present invention may be prepared by copolymerizing ethylene, 1-hexene, and 1-butene in the presence of the supported metallocene catalyst.

The preparation method of the ethylene-1-hexene-1-butene terpolymer may include the steps of preparing the supported metallocene catalyst and carrying out the polymerization reaction of ethylene, 1-hexene, and 1-butene in the presence of the catalyst.

The supported metallocene catalyst may be used to a polymerization reaction by itself. And, the supported metallocene catalyst may be used in the form of preliminarily polymerized catalyst prepared by a contact reaction with the olefinic monomer. For example, the preliminarily polymerized catalyst prepared by separately bringing the catalyst into contact with ethylene, 1-butene, or 1-hexene may be used.

And, the supported metallocene catalyst may be injected into the reactor in the form of being diluted in a C5-C12 aliphatic hydrocarbon solvent (for example, pentane, hexane, heptane, nonane, decane, and isomers thereof), aromatic hydrocarbon solvent such as toluene and benzene, or chlorinated hydrocarbon such as dichloromethane and chlorobenzene. At this time, it is preferable to use the solvent after eliminating a small amount of water or air which can act as a catalyst poison therefrom by adding a small amount of an alkylaluminum to the same.

The polymerization reaction may be carried out by using a continuous slurry polymerization reactor, a loop slurry reactor, a gas phase reactor, or a solution reactor.

The polymerization may be carried out at the temperature of about 25 to about 500° C. and the pressure of about 1 to about 100 kgf/cm$^2$ for about 1 to about 24 hrs. At this time, the polymerization reaction temperature may be about 25 to about 500° C., preferably about 25 to about 200° C., and more preferably about 50 to about 100° C. And, the polymerization reaction pressure may be about 1 to about 100 kgf/cm$^2$, preferably about 1 to about 50 kgf/cm$^2$, and more preferably about 5 to about 40 kgf/cm$^2$.

The ethylene-1-hexene-1-butene terpolymer prepared by above method may be a terpolymer having the properties disclosed above with maintaining the activity equal to or higher than the existing one.

According to another aspect of the present invention, a film including the ethylene-1-hexene-1-butene terpolymer is provided.

The film includes the ethylene-1-hexene-1-butene terpolymer having the characteristics disclosed above, namely, that the CI (Co-monomer Incorporation) Index represented by the following Equation 1 is 0.5 to 5; the density is 0.900 to 0.916 g/cm$^3$; the melt index (MI) measured according to ASTM D1238 at 190° C. and 2.16 kg load condition is 2.0 to 5.0 g/10 mins; and weight ratio of 1-hexene to 1-butene is 1 to 5, and is prepared by using the same.

$$CI\ \text{Index} = \frac{(SCB\ \text{content at high molecular weight side} - SCB\ \text{content at low molecular weight side})}{(SCB\ \text{content at low molecular weight side})} \quad [\text{Equation 1}]$$

Details about Equation 1 and other characteristics of the ethylene-1-hexene-1-butene terpolymer are the same as above.

The film according to the present invention may be prepared by the method of putting the ethylene-1-hexene-1-butene terpolymer pellets in a single screw extruder and carrying out an inflation molding to make the thickness uniform. However, the present invention is not limited to or by this and the film may be prepared by a method commonly used in the art to which the present invention pertains.

The film of the present invention prepared like this has excellent falling dart impact strength and adhesive power.

According to one embodiment of the present invention, the falling dart impact strength of the film of the present invention, measured according to ASTM D 1709 [Method A], may be 600 g or more, preferably about 600 to about 1,500 g, and more preferably about 700 to about 1,200 g, for example.

And, according to one embodiment of the present invention, the adhesive power of the film, measured according to ASTM D 3330, may be 7 or more, preferably about 7 to about 20, and more preferably about 7 to about 15, for example.

Hereinafter, the present invention provides preferable examples for illuminating the present invention. However, following examples are only for understanding the present invention, and the range of the present invention is not limited to or by them.

EXAMPLES

Preparation Examples of Supported Catalyst

Preparation Example 1

Silica (manufacturer: Grace Davision, product name: Sylopol 952) was prepared as the carrier, and it was calcinated at 100° C. for 30 mins.

After putting 100 ml of toluene and 10 g of the silica in a glass reactor and dispersing the same, a part of methylaluminoxane (MAO) solution was dividedly added thereto as the cocatalyst and the former reaction was carried out at 80° C. And then, the rest of methylaluminoxane was added thereto at low temperature and the latter reaction was carried out. Subsequently, unreacted methylaluminoxane was eliminated therefrom by washing the same with a sufficient toluene (amount of MAO loaded: 5 mmol/g carrier (former reaction), 3 mmol/g carrier (latter reaction)).

A toluene solution in which bis(n-butylcyclopentadienyl)-zirconium dichloride, the metallocene compound of Chemical Formula 1, was dissolved was added to the silica on which methylaluminoxane was loaded and the reaction was carried out at 40° C. for 1 hr with stirring. After then, a toluene solution in which t-butoxyhexylmethylsilyl(N-t-buthylamido)(2,3,4,5-tetramethylcyclopentadienyl)-titanium dichloride, the metallocene compound of Chemical Formula 3, was dissolved was added thereto and the reaction was carried out at 40° C. for 1 hr with stirring. After washing the same with a sufficient toluene, the supported metallocene catalyst was obtained into a solid powder by vacuum drying the same.

At this time, the amount of the metallocene compound of Chemical Formula 1 loaded was 0.1 mmol/g·carrier, the amount of the metallocene compound of Chemical Formula 3 loaded was 0.1 mmol/g·carrier, and the ratio of Al/Si content of the supported metallocene catalyst was 29.5 wt % at inner layer and 43.5 wt % at outer layer.

Comparative Preparation Example 1

Silica (manufacturer: Grace Davision, product name: Sylopol 948) was prepared as the carrier, and it was calcined at 100° C. for 30 mins.

After putting 100 ml of toluene and 10 g of the silica in a glass reactor and dispersing the same, methylaluminoxane (MAO) solution was added thereto as the cocatalyst and the reaction was slowly carried out at 40° C. with stirring. Subsequently, unreacted methylaluminoxane was eliminated therefrom by washing the same with a sufficient toluene (amount of MAO loaded: 8 mmol/g carrier).

A toluene solution in which bis(n-butylcyclopentadienyl)-zirconium dichloride, the metallocene compound of Chemical Formula 1, was dissolved was added to the silica on which methylaluminoxane was loaded and the reaction was carried out with stirring. After then, a toluene solution in which t-butoxyhexylmethylsilyl(N-t-buthylamido)(2,3,4,5-tetramethylcyclopentadienyl)-titanium dichloride, the metallocene compound of Chemical Formula 3, was dissolved was added thereto and the reaction was carried out with stirring. After washing the same with a sufficient toluene, the supported metallocene catalyst was obtained into a solid powder by vacuum drying the same.

At this time, the amount of the metallocene compound of Chemical Formula 1 loaded was 0.1 mmol/g·carrier, and the amount of the metallocene compound of Chemical Formula 3 loaded was 0.1 mmol/g·carrier.

Polymerization Examples

Example 1

The catalyst of Preparation Example 1 was introduced into a single loop slurry polymerization process and the linear low density polyethylene was prepared according to an established method. 1-butene and 1-hexene were used as comonomers.

Example 2

The linear low density polyethylene was prepared according to the same method as in Example 1, except that the contents of 1-butene and 1-hexene, the comonomers, were changed.

Example 3

The linear low density polyethylene was prepared according to the same method as in Example 1, except that the contents of 1-butene and 1-hexene, the comonomers, were changed.

Example 4

The linear low density polyethylene was prepared according to the same method as in Example 1, except that the contents of 1-butene and 1-hexene, the comonomers, were changed.

Comparative Example 1

The catalyst of Comparative Preparation Example 1 was introduced into a single loop slurry polymerization process, and the linear low density polyethylene was prepared according to an established method. 1-hexene was used as a comonomer.

Experimental Examples

Measurement on Properties

The polyolefin copolymers obtained in Examples and Comparative Example were treated with an antioxidant (Iganox 1010+Igafos 168, CIBA Co.) and made into pellets by using a twin screw extruder (W&P Twin Screw Extruder, 75 phi, L/D=36) at the extrusion temperature of 180 to 210° C. The films were prepared by using a single screw extruder (Shinwha Industy Co., Single Screw Extruder, Blown Film M/C, 50 phi, L/D=20) at the extrusion temperature of 165 to 200° C. according to an inflation molding method to make the thickness 0.05 mm. At this time, die gap was 2.0 mm and blown-up ratio was 2.3.

The properties of the polyolefin copolymers and the films were measured according to the following evaluation methods and the results are listed in the following Table 1.

1) Density: ASTM 1505

2) Melt Index (MI, 2.16 kg/10 mins): ASTM D1238, 2.16 kg, 190° C.

3) Weight average molecular weight and molecular weight distribution: number average molecular weight, weight average molecular weight, and Z average molecular weight were measured by using a gel permeation chromatography-FT IR (GPC-FTIR) at the measuring temperature of 160° C. The molecular weight distribution is represented by the ratio of weight average molecular weight to number average molecular weight.

4) Falling dart impact strength: falling dart impact strength was measured 20 times or more per a film specimen according to ASTM D 1709 [Method A].

5) Adhesive power: adhesive power was measured 10 times or more per a film specimen according to ASTM D 3330.

6) CI Index: CI Index was calculated by Equation 1 after measuring the SCB contents (the content of C2-C7 branches per 1000 carbons, unit: ea/1,000 C) at the left boundary and the right boundary of the middle range occupying 60% of the whole area except the right 20% of the area and the left 20% of the area in the molecular weight distribution graph, which was obtained by plotting log value of molecular weight M (log M) on x axis against the molecular weight distribution to the log value (dwt/dlog M) on y axis.

At this time, the SCB content at high molecular weight side and the SCB content at low molecular weight side mean the SCB content values at the left boundary and the right boundary of the middle range occupying 60% of the whole area, and they were measured at 160° C. by using PerkinElmer Spectrum 100 FT-IR connected with a high temperature GPC (PL-GPC220), after dissolving a specimen in 1,2,4-trichlorobenzene including 0.0125% of BHT at 160° C. for 10 hrs and pretreating the same by using PL-SP260.

$$CI\ Index = \frac{(SCB\ content\ at\ high\ molecular\ weight\ side - SCB\ content\ at\ low\ molecular\ weight\ side)}{(SCB\ content\ at\ low\ molecular\ weight\ side)} \quad \text{[Equation 1]}$$

TABLE 1

|  |  | Example 1 | Example 2 | Example 3 | Example 4 | Comparative Example 1 |
|---|---|---|---|---|---|---|
| Comonomer | 1-butene (wt %) | 2.7 | 2.7 | 2.9 | 3.2 | — |
|  | 1-hexene (wt %) | 6.9 | 7.2 | 7.9 | 8.3 | 10.3 |
| Melt Index (2.16 kg, 190° C.) | | 3.5 | 3.2 | 3.4 | 3.4 | 3.4 |
| Density(g/cm$^3$) | | 0.916 | 0.915 | 0.912 | 0.907 | 0.918 |
| Weight Average Molecular Weight (*10$^4$ g/mol) | | 9.2 | 9.7 | 9.3 | 9.2 | 9.2 |
| Molecular Weight Distribution | | 2.7 | 2.9 | 2.8 | 2.8 | 2.9 |
| CI Index | | 1.52 | 1.59 | 1.74 | 1.84 | 1.48 |
| Falling Dart Impact Strength (g) | | 680 | 825 | 1,035 | N.B (Not Break) | 460 |
| Adhesive Power | | 7.8 | 8.1 | 9.6 | 12.0 | 5.0 |

Referring to Table 1, Examples 1 to 4 of the present invention show high falling dart impact strength and adhesive power because they have low density while including 1-hexene and 1-butene as comonomers with a certain weight ratio. Therefore, they can be usefully used for a stretch film requiring such properties.

What is claimed is:

1. An ethylene-1-hexene-1-butene terpolymer, of which CI (Co-monomer Incorporation) Index represented by the following Equation 1 is 0.5 to 5; density is 0.900 to 0.916 g/cm$^3$; melt index (MI) measured according to ASTM D1238 at 190° C. and 2.16 kg load condition is 2.0 to 5.0 g/10 mins; and weight ratio of 1-hexene to 1-butene is 1 to 5:

$$CI\ Index = \frac{(SCB\ content\ at\ high\ molecular\ weight\ side\ -\ SCB\ content\ at\ low\ molecular\ weight\ side)}{(SCB\ content\ at\ low\ molecular\ weight\ side)}\quad [Equation\ 1]$$

in Equation 1, the SCB (short chain branch) content (unit: ea/1,000 C) means the content of C2-C7 branches per 1000 carbons, and the SCB content at low molecular weight side and the SCB content at high molecular weight side mean the SCB content values at the left boundary (the SCB content at low molecular weight side) and the right boundary (the SCB content at high molecular weight side) of the middle range that occupies 60% of the whole area except the right 20% of the area and the left 20% of the area in the molecular weight distribution graph obtained by plotting log value of molecular weight M of the ethylene-1-hexene-1-butene terpolymer (log M) on x axis against the molecular weight distribution to the log value (dwt/dlog M) on y axis.

2. The ethylene-1-hexene-1-butene terpolymer according to claim 1, of which weight average molecular weight is 50,000 to about 150,000 g/mol.

3. The ethylene-1-hexene-1-butene terpolymer according to claim 1, of which molecular weight distribution (weight average molecular weight/number average molecular weight) is 1.5 to 5.

4. The ethylene-1-hexene-1-butene terpolymer according to claim 1, wherein the content of 1-hexene and 1-butene to the total weight of the ethylene-1-hexene-1-butene terpolymer is 5 to 15 wt %.

5. The ethylene-1-hexene-1-butene terpolymer according to claim 1, which is prepared by copolymerizing ethylene, 1-hexene, and 1-butene, in the presence of a supported metallocene catalyst that is composed of the outer layer including the area from each surface to ⅓ position of the particle diameter toward the center and the inner layer including the rest area from ⅓ position of the particle diameter to the center, in the cross-section of the supported catalyst particle, and includes a silica carrier on whose inside and surface an alkylaluminoxane is loaded; and one or more metallocene compounds loaded on the silica carrier, wherein the content ratio of Al/Si elements of the inner layer is 65% or more than the content ratio of Al/Si elements of the outer layer.

6. The ethylene-1-hexene-1-butene terpolymer according to claim 5, wherein the content ratio of Al/Si elements of the inner layer is 90 to 150% more than the content ratio of Al/Si elements of the outer layer.

7. The ethylene-1-hexene-1-butene terpolymer according to claim 5, wherein the metallocene compound is one or more compounds selected from the group consisting of a metallocene compound including a non bridge Cp and a Cp, a metallocene compound including a Si bridge Cp and a Cp, a metallocene compound including a C bridge Cp and a Cp, a metallocene compound including a Si bridge Cp and an amine, a metallocene compound including an ethylene bridge Cp and a Cp, a metallocene compound including a phenylene bridge Cp and an amine, and a metallocene compound including a C—C bridge, a Si—C bridge, or a Si—Si bridge.

8. The ethylene-1-hexene-1-butene terpolymer according to claim 5, wherein the silica carrier is one or more carriers selected from the group consisting of silica, silica-alumina, and silica-magnesia.

9. The ethylene-1-hexene-1-butene terpolymer according to claim 5, wherein the alkylaluminoxane is one or more compounds selected from the group consisting of methylaluminoxane, ethylaluminoxane, butylaluminoxane, and isobutylaluminoxane.

10. The ethylene-1-hexene-1-butene terpolymer according to claim 5, wherein the amount of the metallocene compound loaded on the silica carrier is 0.01 to 1 mmol/g.

11. A film, including the ethylene-1-hexene-1-butene terpolymer of claim 1.

12. The film according to claim 11, of which the falling dart impact strength measured according to ASTM D 1709 [Method A] is 600 to 1,500 g.

13. The film according to claim 11, of which the adhesive power measured according to ASTM D 3330 is 7 or more.

* * * * *